United States Patent Office 3,372,112
Patented Mar. 5, 1968

3,372,112
DRILLING FLUIDS HAVING ENHANCED
LUBRICATING PROPERTIES
Harry W. Parker, Bartlesville, Okla., assignor to Phillips
Petroleum Company, a corporation of Delaware
No Drawing. Filed May 14, 1964, Ser. No. 367,565
10 Claims. (Cl. 252—8.5)

This application relates to drilling fluids having enhanced lubricating properties. In one aspect this invention relates to improved drilling fluids containing an added agent which imparts enhanced lubricating properties thereto. In another aspect this invention relates to methods of using said improved drilling fluids.

In the art of drilling wells to tap subterranean deposits of fluids such as oil and/or gas, especially when drilling by the rotary method employing a rotary bit and drill stem, a drilling fluid, usually a compounded fluid made to predetermined physical and chemical properties, is circulated to the bottom of the bore hole, out through openings in the bit at the bottom of the bore hole, and then back up said bore hole to the surface by passage through the anular space between said drill stem and the wall of said bore hole (or between said drill stem and the wall of the casing where casing has been put in place).

The drilling fluid must act as a liquid medium of controlled viscosity for removing cuttings from the bore hole; it must prevent excessive amounts of fluid from flowing from the bore hole into surrounding formations by depositing on the wall of the hole a thin but substantially impervious filter cake; it must possess a gel structure of sufficient strength to hold in suspension solids, particularly during any time the fluid is not circulating; it must serve as a weighting material exerting sufficient pressure to counterbalance any pressure exerted by water, gas, oil, or other fluid from a penetrated structure and to prevent caving or other intrusion into the drill hole. Said drilling fluid must also serve as a lubricant for the bearings of the drill bit and the cutting surface of the bit teeth, and to reduce frictional forces on the drill pipe.

These requirements have been met in the past by employing both aqueous or water base and non-aqueous or oil base drilling fluids. The aqueous drilling fluids normally comprise water, finely divided inorganic materials such as various types of clays and clayey materials, and weighting materials suspended in the water. The non-aqueous or oil base drilling fluids normally comprise a non-aqueous liquid such as crude oil or a petroleum distillate, and a weighting material which can be a clay or other suitable material. In addition to aqueous and non-aqueous drilling fluids as defined above, emulsion-type drilling fluids are often used. These emulsion drilling fluids normally comprise a substantially water-insoluble liquid such as oil, a finely divided inorganic material such as clay, and water, together with a suitable dispersing or emulsifying agent. The two types of emulsion drilling fluids are the oil-in-water emulsion type, sometimes referred to as water base emulsion type, and the water-in-oil emulsion type, sometimes referred to as oil base emulsion type. In the latter, oil forms the continuous phase of the emulsion, and in the former, water or brine forms the continuous phase of the emulsion.

An important property which a drilling fluid should possess is that of lubrication. In recent years increased emphasis has been placed upon this property. A large portion of the drilling time consumed during the drilling of a well is taken up in replacing drill bits. The amount of time consumed during drilling operations in replacing drill bits increases roughly in proportion to the depth drilled because, in order to replace a bit the entire drill string must be removed, the bit replaced, and the entire drill string then rerun. Futhermore, each time circulation of the drilling fluid is stopped and the drill string pulled, the likelihood of a cave-in is increased. Past experience has shown that the most important factor in shortening the life of a drill bit is failure of the bit bearings. Such bearing failures frequently occur long before the cutting teeth are worn to such an extent as to require replacement of the bit. Thus, conventional prior art drilling fluids are obviously lacking in adequate lubrication properties insofar as the bearings of the bit are concerned.

It is also important to reduce the frictional forces on the drill pipe. There exists considerable torque on said drill pipe due to the friction between the outside of the drill pipe and the wall of the well, whether said wall is represented by casing, open hole, cement, or other materials. A drilling fluid possessing enhanced lubrication properties will minimize said frictional forces.

I have now discovered that aqueous drilling fluids, e.g., water base drilling fluids and oil-in-water emulsion drilling fluids, can be made to possess enhanced lubricating properties and improved fluid loss properties by incorporating therein certain amines as defined hereinafter.

Thus, broadly speaking, the present invention resides in: (1) improved aqueous drilling fluids having incorporated therein a small but effective amount of a suitable amine (defined hereinafter) sufficient to improve the lubricating properties of said drilling fluid, said amount being insufficient to increase the viscosity of the drilling fluid to the extent that it cannot readily be pumped or circulated; and (2) methods of using said drilling fluids.

An object of this invention is to provide an improved well drilling fluid. Another object of this invention is to provide an improved drilling fluid having enhanced lubricating properties. Another object of this invention is to provide an additive for use in aqueous drilling fluids, e.g., water base drilling fluids and oil-in-water emulsion drilling fluids, which will impart enhanced lubricating properties to said drilling fluid so that said drilling fluid will more effectively lubricate the bearings of a rotary bit under extreme pressure conditions which are encountered during drilling operations employing said bit. Another object of this invention is to provide methods of using said improved drilling fluids in the drilling or workover of wells. Another object of this invention is to provide a method of drilling and/or completing a well in which method a drilling fluid of the invention is circulated in said well. Other aspects, objects, and advantages of the invention will be apparent to those skilled in the art in view of this disclosure.

Thus, according to the invention, there is provided an aqueous drilling fluid having enhanced lubricating poperties comprising water, finely divided inorganic solids, and a small but effective amount, sufficient to provide said enhanced lubricating properties, of a non-heterocyclic amine containing at least 8 carbon atoms and only carbon, hydrogen, and nitrogen atoms.

Further according to the invention, there are provided methods of using the improved well drilling fluids of the invention, which methods comprise circulating said well drilling fluids into and from the bore hole in contact with the walls of said bore hole.

Any suitable non-heterocyclic amine containing at least 8 carbon atoms and only carbon, hydrogen, and nitrogen atoms can be used in the practice of the invention. Thus, the invention should not be limited to any particular class or type of amines. Those skilled in the art will have no difficulty in determining what are suitable amines in view of this disclosure. A group of presently preferred amines are those which can be characterized by the formula

wherein: each R is selected from the group consisting of hydrogen, hydrocarbon radicals containing from 1 to 22 carbon atoms, amino substituted hydrocarbon radicals containing from 1 to 22 carbon atoms and also containing at least one —NH$_2$ substituent attached to a carbon atom other than a carbon atom which is alpha to a —NH$_2$ group, said hydrocarbon radicals wherein at least one —CH$_2$— other than a —CH$_2$— attached to a nitrogen atom is replaced with

and said amino substituted hydrocarbon radicals wherein at least one —CH$_2$— other than a —CH$_2$— attached to a nitrogen atom is replaced with

at least one R contains at least 8 carbon atoms, and the total number of nitrogen atoms in the molecule does not exceed 4 and preferably does not exceed 2. Said hydrocarbon portions of the above-described amines can be alkyl, cycloalkyl, alkylene, cycloalkylene, aryl, alkaryl, or aralkyl. It is not necessary that the amines used in the practice of the invention be pure compounds. Mixtures of the above-described amines can be used.

Examples of amines which can be used in the practice of the invention include, among others, the following: octylamine; decylamine; dodecylamine; tetradecylamine; hexadecylamine; octadecylamine; docosylamine; 9-methyldecylamine; 2-ethyltetradecylamine; N-ethyldodecylamine; N,N-dimethyltetradecylamine; didecylamine; tridocosylamine; 1,16-hexadecanediamine; didecylenetriamine; tris(10-aminodecyl)amine; tributylenetetramine; 5-octenylamine; N-propyl-10-dodecenylamine; 9-octadecenylamine; N,N-dibutyl - 7 - docosenylamine; N-cyclopentyltridecylamine; N-methyl - N - cyclohexylpentadecylamine; N-2-cyclohexen - 1 - yloctadecylamine; N-ethyl-N-phenylhexadecylamine; N-p-tolyleicosylamine; N-benzyltetradecylamine; N-octadecyl-m-phenylenediamine; and the like.

Amines whose substituents are derived from fatty acids obtained from naturally occurring fats and oils, such as coconut oil, tallow, and the like, are included among the above-described amines which can be used in the practice of the invention. In such amines the N-substituents will be straight chain aliphatic hydrocarbon radicals which contain even numbers of carbon atoms within the range of from 8 to 22. Examples of such amines which are commercially available include, among others, the following:

TABLE I

| Amine: | Hydrocarbon chain length |
|---|---|
| Alamine 4D (distilled primary lauryl amine) | 12 |
| Alamine 6D (distilled primary palmityl amine) | 16 |
| Alamine 7 D (distilled primary stearyl amine) | 18 |
| Alamine 11D (distilled primary oleyl amine) | 18 |
| Alamine 21D (distilled primary coconut oil amine) | 8–18 |
| Alamine 26D (distilled primary tallow amine) | 16–18 |
| Alamine H26D (distilled primary hydrogenated tallow amine) | 16–18 |
| Alamine 33D (distilled primary cottonseed oil amine | 16–18 |
| Alamine 221 (secondary coconut oil amine) | 8–18 |
| Alamine H226 (secondary hydrogenated tallow amine) | 16–18 |
| Alamine 336 (tricaprylyl amine) | 8–10 |
| Diam 21D (distilled N-coco-1,3-propylene diamine) | 8–18 |
| Diam 26 (N-tallow-1,3-propylene diamine) | 16–18 |

The above commercially available fatty amines having amine contents of up to 97 percent are available from General Mills, Chemical Division, Kankakee, Illinois.

The aliphatic fatty amines form a presently more preferred group of amines for use in the practice of the invention because of their commercial availability and ease of preparation.

The amines used in the practice of the invention are known compounds. A number of methods are known for the preparation of such amines. Some of said methods are illustrated in Examples II and III below. Said aliphatic fatty amines can also be prepared starting with the fatty acid if desired. In one such method, a fatty acid having the desired hydrocarbon chain length is treated with ammonia to form the ammonium salt. Said ammonium salt is then converted by dehydration to the corresponding nitrile. Said nitrile can be hydrogenated to the corresponding primary amine. During said hydrogenation some secondary and tertiary amines are formed which are higher boiling than the primary amine. Upon distillation of the hydrogenation product to recover the primary amine, said secondary and tertiary amines are left as a residue. Alamine 60 is a commercial mixed amines residue resulting from the preparation of commercial fatty amines such as in Table I above.

The amines used in the practice of the invention can be incorporated in the aqueous drilling fluids in any suitable manner. Many of said amines are insoluble in water. However, this presents no problem because they are readily dispersible in water, aqueous solutions, or aqueous emulsions such as oil-in-water emulsions. Thus, said amines can be added to the aqueous drilling fluids as a dispersion in water, a dispersion in an aqueous solution of another additive, or a dispersion in an aqueous emulsion. If desired, said dispersions of said amines can be added directly as such to the jet hopper commonly employed in formulating drilling fluids. The incorporation of said amines into the drilling fluids can either be before or during the drilling of the well. Thus, said amines can be incorporated in the drilling fluids of the invention in any suitable manner and at any suitable time.

The amount of amine used in drilling fluids in accordance with the invention will vary from well to well depending upon conditions encountered in the drilling or other operations on the well, the characteristics of the particular drilling fluid being used, the formation being drilled, and other factors which can be readily determined by those skilled in the art upon being acquainted with this disclosure. It has long been customary in rotary well drilling operations to subject the drilling fluid to simple routine tests from time to time, and these tests are sufficient to indicate the relative amounts of amine, water, oil, or other ingredients to be employed in the drilling fluids of the invention.

While therefore the amount of amine used in the drilling fluids of the invention is not of the essence of the invention, it can be stated that the amount used will normally be within the range of about 1 to 24, preferably 3 to 15, pounds per barrel of drilling fluid. However, it is within the scope of the invention to employ amounts of amine which are outside said ranges. As used herein and in the claims, unless otherwise specified, the word "barrel" refers to a barrel of 42 standard U.S. gallons.

It is usually not desirable to use a drilling fluid which has a pH value of less than 7. Thus, it is desirable, but not always essential, to add sufficient of an alkali metal hydroxide to the drilling fluids of the invention to increase the pH of said drilling fluids to at least 7, preferably from about 8.0 to 12, as desired. Said alkali metal hydroxide can be incorporated in the drilling fluid in specific amounts during the formulation thereof, or can be added in amounts sufficient to give a desired pH value in the completed drilling fluid.

The amine utilized in the practice of the invention can be used in a wide variety of aqueous drilling fluids, e.g., water base drilling fluids and oil-in-water emulsion drilling fluids. In some wells, particularly where hard limestone formations containing no shale or clay are being drilled, the drilling fluid can be water containing only a very small amount of finely divided inorganic solids such as clay solids. Many times the drilling of a well is started with only water as the drilling fluid. As the drilling progresses and shales or clay formations are penetrated, the circulating water will pick up natural clays and become what is commonly referred to as a drilling mud or drilling fluid. In such instances the natural clays can constitute as much as 40 percent by weight of the drilling fluid. More frequently, however, it is desirable to prepare a drilling fluid which is to be used in the drilling by mixing a clayey material such as a natural clay or bentonite with water. If a drilling fluid is thus prepared, the concentration of the clayey material is usually much lower, generally constituting from about 1 to about 15 weight percent of the entire composition. Thus, the drilling fluids of the invention in which the amine is utilized can contain only relatively small amounts of said clayey materials or can contain said clayey materials in amounts up to about 40 weight percent of the entire composition.

The finely divided inorganic solids used in the drilling fluids increase the viscosity and afford plastering properties to said fluids by aiding the formation of a filter cake on the wall of the bore hole and thus aid in reducing fluid loss to the formations penetrated by said bore hole. While the presence of said solids is desirable initially, it should be pointed out that the drilling fluids of the invention are operable without the initial addition of said solids because a certain solids content will develop during the drilling. The finely divided inorganic solids used in the practice of the invention should be insoluble in the oil phase as well as insoluble in the water phase so that they will remain undissolved over long periods of time. Examples of finely divided solids suitable for use in the practice of the invention include, among others, the following: bentonite, ground limestone, barites, ground oyster shells, diatomaceous earth, Fuller's earth, kaolin, attapulgite, McCracken clay, and other native and/or treated clays. Mixtures of two or more of said finely divided solids can also be used. Some of said materials such as barites and limestone are used primarily as weighting agents. All of said materials are preferably ground until at least 90 percent will pass through a 325-mesh screen.

A preferred drilling fluid for many drilling operations is an oil-in-water emulsion drilling fluid. These drilling fluids can also contain clay or clayey materials in concentrations ranging from small amounts up to about 40 weight percent. Said oil-in-water emulsion drilling fluids are usually distinguished from water base drilling fluids by their content of from 1 to 40, preferably 3 to 25, weight percent of oil. However, there is really no sharp dividing line between water base drilling fluids and oil-in-water emulsion drilling fluids because water forms the continuous phase in both. Both are frequently referred to as aqueous drilling fluids. Thus, herein and in the claims, unless otherwise specified, the term "aqueous drilling fluid" is used generically and refers to both water base drilling fluids and oil-in-water emulsion drilling fluids.

In an oil-in-water emulsion drilling fluid, the principal value of the oil is as an aid in controlling the density of the drilling fluid and its fluid loss properties. Oils which can be used in the practice of the invention are usually petroleum oils, although other oleaginous materials such as vegetable and animal oils can be used, though seldom with economic advantage. The oils in any event should contain at least some material boiling above the gasoline boiling range, i.e., above about 400° F. at atmospheric pressure. Oils with too high a content of highly volatile hydrocarbons in the gasoline boiling range are undesirable because of the danger of fire, and because of the low viscosity. It is preferred that the oil have a flash point about 140° F. Examples of suitable oils which can be employed in the practice of the invention include, among others, the following: crude oil, topped crude oil, gas oils, kerosene, diesel fuels, heavy alkylates, fractions of heavy alkylates, heavy fuel oil, various other petroleum fractions, and the like. The more preferred oils are predominantly paraffinic in character since these are less detrimental to rubber components in pumps, lines, etc. It is preferred that the oil have a gravity within the range of 15-40° API.

The aqueous drilling fluids of the invention, both the water base drilling fluids and the oil-in-water emulsion drilling fluids, can contain other additives such as emulsifiers, stabilizers, and thinning agents when required to adjust the properties of the drilling fluids in accordance with conventional practice. Thus, it will be understood that other additives can be added to the drilling fluids of this invention without departing from the scope of the invention. Special materials are oftentimes added to drilling fluids for particular purposes, and such additional materials can be employed in the drilling fluids of this invention, providing a usual and conventional test indicates a lack of obvious adverse reactions, and such additional additives are applicable in the drilling fluids of this invention with few, if any, exceptions.

The other properties, and the tests therefor, which are essential to drilling fluids, such as viscosity, water or fluid loss, surface tension, gel strength, and absence of foaming, are not significantly affected by the presence of the amines in the aqueous drilling fluids of the invention.

In the examples given hereinafter, the lubricating properties of the drilling fluids of the invention were determined by employing a modified Shell Four-Ball Extreme Pressure Lubricant Tester. Said Shell Four-Ball Tester is well known to those skilled in the art and one model thereof is available commercially from the Precision Scientific Company, 3737 West Cortland Street, Chicago 47, Illinois.

Essentially, the Four-Ball E.P.L. Tester consists of four metal balls arranged in the form of an equilateral tetrahedron. The basic elements are three lower balls held immovably in a clamp to form a cradle in which a fourth or upper ball is caused to rotate about a vertical axis under prescribed conditions of load and speed. The contacting surfaces on the four-ball type apparatus are geometrically well-defined, thus providing obvious advantages in the study of wear and friction phenomena.

The points of contact are lubricated by the lubricant under test, which is held in a cup surrounding the four-ball assembly. There is a lever and thrust bearing arrangement for varying the force with which the three balls are pushed upward against the rotating ball. Also, there is a torque measuring device attached to the cup assembly and friction is measured by determining the torque on the lower ball holder.

Further details concerning said Shell Four-Ball Tester can be found in the manual furnished with the machine or available from said Precision Scientific Company, Technical Service Department, as Form No. 261.

For use in determining the lubricating properties of the drilling fluids of the invention said Shell Four-Ball Tester was modified by substituting three Pyrex balls for the three steel balls mounted in the lower position. A steel ball was retained for the fourth or upper ball. The coefficient of friction, $\mu$, is determined from torque as follows. Torque is registered on a chart which is wrapped around a drum traveling at one r.p.m. In making a measurement, a base line is drawn with the chart drive operating, but with the spindle motor not operating. Then, the sample cup assembly containing the three lower positioned Pyrex balls is given a thrust load of 6 kilograms, and a run of one minute is made with the spindle and chart drive both operating. The machine is temporarily shut off, and the thrust is raised to 12 kg. for another one-minute run. Likewise, runs are made at 18, 24, 30, and 36 kg. unless the torque indicator becomes "pegged," in which case the runs are terminated. The balls are not changed during the runs on a given sample. Each one-minute run serves as a run-in period for the next higher load.

The distance (in mm.) between the base line and the curve (at a given loading) is measured at 5-second intervals and averaged. Then, $$\mu = 0.3365 \ U/P$$

where
$U$ = displacement of pen in mm., and
$P$ = thrust loading in kg.

Numerous tests on a wide variety of drilling fluids have shown that coefficients of friction determined on the above-described modified Shell Four-Ball Tester are reliable in evaluating the lubricating properties of drilling fluids.

The following examples will serve to further illustrate the invention. In the data reported in Tables II and III hereinafter a zero (0) value for the coefficient of friction means the coefficient of friction was too small to measure.

*Example I*

A series of water base drilling fluids containing 12.5 weight percent McCracken clay and various quantities of fatty amines or fatty diamines dispersed therein was prepared for test runs. Sodium hydroxide was added to each sample of drilling fluid in sufficient quantity to obtain the pH shown in Table II below. Each drilling fluid sample was prepared by mixing the water, McCracken clay, sodium hydroxide, and amine or diamine with a high-speed stirrer for 30 minutes and then allowing the drilling fluid to stand for 3 hours before testing. Each drilling fluid was tested for pH in conventional manner and then tested for lubricating properties with a modified Shell four-Ball Tester as described above. The results of these test runs, as well as those of two control test runs in which no amine or diamine was employed, are shown in Table II below.

autoclave. Two other runs of the same magnitude were carried out similarly. The three reaction mixtures were combined and the more volatile substances were removed. To the residual material, which weighed 437 g., were added 550 ml. of methanol and 700 ml. of heptane. The two layers were separated, and the methanol layer was extracted twice with 100-ml. portions of heptane. The heptane layers were combined and washed with five 100-ml. portions of water. The aqueous extracts were combined wtih the methanol layer, and 65 g. of sodium hydroxide was added as a 20 percent aqueous solution. The resulting solution was then extracted with one 200-ml. and two 150-ml. portions of heptane. The combined heptane extracts were washed with five 100-ml. portions of distilled water. After filtration of the heptane solution, the solvent was removed under reduced pressure to give 295 g. of crude amines, which were distilled to give four fractions of mixed hexadecylamines weighing 168.1 g. and boiling at 103° C./0.15 mm. Hg; $N_D^{20}$ 1.4455–1.4460.

To obtain an additional quantity of the hexadecylamines, the reaction was carried out similarly in three other runs, in which the method of isolation of the amines was slightly different. After combination of the three reaction products, the more volatile substances were removed, methanol was added, and the solid material was filtered off. The methanol solution was extracted with heptane as before, after which the solid material above was added to the methanol layer, which was then treated with 65 g. of sodium hydroxide in a 20 percent aqueous solution. The resulting mixture was extracted three times with heptane and washed with water. Removal of solvent from the heptane solution under reduced pressure gave 316.3 g. of crude amines, which were distilled to give seven frac-

TABLE II

| Run No. | Additive Substance | Lb./bbl. fluid | pH | Coefficient of Friction $\mu$ of Drilling Fluid at kg. Values Given Below | | | | | |
|---|---|---|---|---|---|---|---|---|---|
| | | | | 6 | 12 | 18 | 24 | 30 | 36 |
| Control | None | 0 | 10.5 | 0.45 | 0.52 | 0.55 | 0.53 | 0.44 | 0.36 |
| 1 | Alamine 60 [1] | 3 | 10.0 | 0.286 | 0.432 | 0.311 | 0.270 | 0.222 | 0.163 |
| 2 | do [1] | 6 | 10.2 | 0.196 | 0.055 | 0.054 | 0.162 | 0.059 | 0.042 |
| 3 | do [1] | 12 | 10.1 | 0 | 0 | 0 | 0 | 0 | 0 |
| 4 | Diam 21D [2] | 6 | 11.2 | 0.13 | 0.081 | 0.054 | 0.04 | 0.045 | 0.038 |
| 5 | Dodecylamine | 6 | 10.5 | 0.004 | 0.077 | 0.169 | | | |
| 6 | do | 12 | 11.4 | 0.062 | 0.031 | 0.031 | | | |

[1] Mixed crude amine residues resulting from preparation of commercial fatty amines such as in Table I above.
[2] Commercial distilled N-coco-1,3-propylenediamine.

A comparison of the results of Runs 1 to 6 with the results obtained in the control run shows that the additives of the invention are effective for improving the lubricating properties of drilling fluids.

*Example II*

A mixture of monochlorohexadecanes was prepared by the reaction of hexadecane with elemental chlorine. Hexadecane (1155 g.; sp. gr. 0.771) was placed in a two-liter three-necked flask protected from light and equipped with stirrer, thermometer, inlet gas dispersion tube, and gas outlet. The system was flushed with nitrogen, and the hexadecane was heated to 71° C. Chlorine, dried by passing through calcium chloride, was then passed into the stirred solution maintained at 71° C. until the specific gravity of the reaction mixture reached a value of 0.801. The addition of chlorine was discontinued, the reaction mixture was cooled, and nitrogen was passed through the cooled solution to remove hydrogen chloride and unreacted chlorine. The reaction mixture, to which was added 2.0 g. of calcium carbonate to aid in preventing decomposition, was then distilled to give three fractions (561.8 g.) of chlorohexadecanes boiling at 106° C./0.03–0.08 mm. Hg; $N_D^{20}$ 1.4485–1.4499. These fractions were combined for use in the preparation of the mixture of primary hexadecylamines.

A mixture of 130.5 g. of the above chlorohexadecanes, 85 g. of anhydrous ammonia, and 150 ml. of methanol was heated at 200° C. for 2 hours in a one-liter stirred tions of mixed hexadecylamines having a total weight of 206.5 g. and boiling at 101.5° C./0.09 mm.–94° C./0.03 mm. Hg, $N_D^{20}$ 1.4451–1.4460. These seven fractions were combined with the four fractions of mixed hexadecylamines described above, and samples of the resulting mixture were employed as a drilling fluid additive in test runs as described below.

The residues from the distillations of the above mixed primary hexadecylamines were combined and employed as a drilling fluid additive in a test run, as described below. Said residues were comprised substantially of the higher boiling secondary and tertiary hexadecylamines.

*Example III*

A mixture of N-hexadecyl-1,3-propanediamines was prepared by hydrogenation of a mixture of N-(2-cyanoethyl)hexadecylamines obtained by reaction of acrylonitrile with the mixture of hexadecylamines described above. To 80.4 g. of the mixed hexadecylamines in a 500-ml. three-necked flask equipped with stirrer, dropping funnel, reflux condenser, and thermometer was added 53.1 g. of freshly distilled acrylonitrile over a period of 13 minutes, during which time the mixture was maintained at 50–55° C. The temperature was then increased, and the mixture was stirred at approximately 70–75° C. for about 2 hours. After removal of the unreacted acrylonitrile at reduced pressure, the product was distilled to give three fractions of mixed N - (2-cyanoethyl)hexadecylamines weighing 33.8 g., B.P. 146° C./0.08 mm.–152° C./0.07 mm. Hg, $N_D^{20}$ 1.4553–1.4558, sp. gr. 0.855.

To obtain an additional quantity of the cyanoethylated amines, the reaction above was repeated with the same quantities of reactants. This time the addition of acrylonitrile was carried out at 60° C., and the mixture was then stirred at 70–75° C. for 5 hours. After removal of the unreacted acrylonitrile at reduced pressure, the product was distilled to give three fractions of mixed N-(2-cyanoethyl)hexadecylamines weighing 30.6 g., B.P. 144° C./0.18–0.12 mm. Hg, $N_D^{20}$ 1.4552–1.4555. These three fractions were combined with the above cyanoethylated amines.

To prepare a mixture of N-hexadecyl-1,3-propanediamines, 63.1 g. of the combined mixed N-(2-cyanoethyl)-hexadecylamines and 200 ml. of methanol containing 20 g. of anhydrous ammonia were placed in a one-liter stirred autoclave. The sealed autoclave was heated to about 70° C., then cooled to about 8° C. Raney nickel (15 ml.), previously washed with water and alcohol, was added, and the autoclave was flushed twice with hydrogen, then pressured to 1100 p.s.i.g. with hydrogen. The mixture was stirred at 125° C. for 2 hours, then cooled to 16° C., at which temperature the pressure had dropped to 750 p.s.i.g. The catalyst was removed by filtration of the reaction mixture, and the alcohol and ammonia were distilled under reduced pressure to give 64.4 g. of residual material. Distillation of this material yielded 26.7 g. of mixed N-hexadecyl-1,3-propanediamines boiling at 145–146° C./0.23–0.26 mm. Hg, $N_D^{20}$ 1.4576, sp. gr. 0.830/24° C. Samples of this mixture of diamines were employed as a drilling fluid additive in test runs as described below.

*Example IV*

Another series of water base drilling fluids containing 20 weight percent kaolin and 4 weight percent bentonite were prepared by first rolling in a bottle for 3 days, 5 gallons of a mixture of the required quantities of water, kaolin, and bentonite. This drilling fluid, designated as KB5 mud, was then used in preparing the sample drilling fluids to be used in the test runs. In some instances the KB5 mud was diluted with an equal volume of water prior to further preparation for the test runs. This diluted KB5 mud is herein designated as ½ KB5 mud. In preparing the sample drilling fluids the desired quantity of fatty amine or fatty diamine additive was added to a sample of KB5 or ½ KB5 mud, and the pH was adjusted to the desired value. The mixture was then stirred for 30 minutes with a high-speed stirrer, after which it was allowed to age 1–3 hours at room temperature. The sample drilling fluid was then tested for lubricating properties with the Shell Four-Ball Tester as in Example I. Control samples of KB5 and ½ KB5 muds containing no amine or diamine were also tested for lubricating properties. The results of these tests are shown in Table III.

A comparison of the results of Runs 1–10 with the results obtained in the two control runs shows that the additives of the invention are effective for improving the lubricating properties of drilling fluids.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A pumpable aqueous drilling fluid having enhanced lubricating properties consisting of water, from 1 to 15 weight percent of finely divided inorganic solids, and a small but effective amount, sufficient to provide said enhanced lubricating properties but insufficient to increase the viscosity of the drilling fluid to the extent that it cannot be readily pumped and circulated, of an amine selected from the group of amines having the formula

wherein: each R is selected from the group consisting of hydrogen, hydrocarbon radicals containing from 1 to 22 carbon atoms, amino substituted hydrocarbon radicals containing from 1 to 22 carbon atoms and also containing at least one —NH₂ substituent attached to a carbon atom other than a carbon atom which is alpha to a —NH₂ group, said hydrocarbon radicals wherein at least one —CH₂— other than a —CH₂— attached to a nitrogen atom is replaced with

and said amino substituted hydrocarbon radicals wherein at least one —CH₂— other than a —CH₂— attached to a nitrogen atom is replaced with

at least one R contains at least 8 carbon atoms, and the total number of nitrogen atoms in the molecule does not exceed 4; and mixtures of said amines; said amount of said amine being within the range of from 3 to 15 pounds per barrel of said fluid.

2. A drilling fluid according to claim 1 wherein said amine is N-coco-1,3-propylene diamine.

3. A drilling fluid according to claim 1 wherein said amine is hexadecyl amine.

4. A drilling fluid according to claim 1 wherein said amine is dodecyl amine.

5. A drilling fluid according to claim 1 wherein said amine is N-hexadecyl-1,3-propane diamine.

6. A drilling fluid according to claim 1 wherein said amine is a mixture of amines comprised substantially of secondary and tertiary hexadecyl amines.

7. A drilling fluid according to claim 1 wherein said

TABLE III

| Run No. | Mud | Additive Substance | Lb./bbl. Fluid | pH | Coefficient of Friction μ of Drilling Fluid at kg. Values Given Below | | | | | |
|---|---|---|---|---|---|---|---|---|---|---|
| | | | | | 6 | 12 | 18 | 24 | 30 | 36 |
| Control | KB5 | None | | 10.4 | 0.392 | 0.547 | 0.380 | 0.315 | | |
| Do | ½ KB5 | do | | 9.0 | 0.336 | 0.562 | 0.505 | 0.256 | 0.227 | |
| 1 | KB5 | Hexadecylamines [3] | 3 | ~8 | 0.106 | 0.361 | 0.312 | 0.232 | 0.298 | |
| 2 | KB5 | do | 6 | ~8 | 0.173 | 0.078 | 0.153 | 0.249 | 0.196 | 0.163 |
| 3 | KB5 | do | 12 | ~8 | 0.112 | 0.056 | 0.037 | 0.046 | 0.044 | |
| 4 | KB5 | N-Hexadecyl-1,3,propanediamines.[4] | 6 | ~8 | 0.072 | 0.060 | | | | |
| 5 | KV5 | do.[4] | 12 | ~8 | 0.044 | 0.022 | 0.044 | 0.036 | 0.029 | 0.024 |
| 6 | KV5 | Residue from hexadecylamines.[3] | 12 | ~8 | 0.112 | 0.056 | 0.037 | | | |
| 7 | ½ KB5 | Diam 21D [5] | 1 | 7.0 | 0.268 | | | | | |
| 8 | ½ KB5 | do.[5] | 3 | 9.4 | 0.266 | 0.137 | 0.105 | 0.083 | 0.246 | 0.214 |
| 9 | ½ KB5 | do.[5] | 6 | 9.7 | 0.254 | 0.161 | 0.114 | 0.105 | 0.089 | 0.061 |
| 10 | ½ KB5 | do.[5] | 12 | 10.1 | 0 | 0.038 | 0.044 | 0.033 | 0.026 | 0.022 |

[3] From Example II above.  [4] From Example III above.  [5] Commercial distilled N-coco-1,3-propylenediamine.

amine is a mixture of amines comprised substantially of secondary and tertiary amines resulting from the preparation of aliphatic primary fatty amines having hydrocarbon chain lengths of from 8 to 18 carbon atoms.

8. A water base drilling fluid having enhanced lubricating properties, said drilling fluid consisting of water from 1 to 15 weight percent of finely divided inorganic solids, sufficient to form a filter cake on the wall of the well; and a small but effective amount, sufficient to provide said enhanced lubricating properties but insufficient to increase the viscosity of the drilling fluid to the extent that it cannot be readily pumped and circulated, of an amine selected from the group of amines having the formula

wherein: each R is selected from the group consisting of hydrogen, hydrocarbon radicals containing from 1 to 22 carbon atoms, amino substituted hydrocarbon radicals containing from 1 to 22 carbon atoms and also containing at least one —$NH_2$ substituent attached to a carbon atom other than a carbon atom which is alpha to a —$NH_2$ group, said hydrocarbon radicals wherein at least one —$CH_2$— other than a —$CH_2$— attached to a nitrogen atom is replaced with

and said amino substituted hydrocarbon radicals wherein at least one —$CH_2$—other than a —$CH_2$— attached to a nitrogen atom is replaced with

at least one R contains at least 8 carbon atoms, and the total number of nitrogen atoms in the molecule does not exceed 4; and mixtures of said amines; said amount of said amine being at least 6 pounds per barrel of said drilling fluid.

9. In a process for the drilling of a well with well drilling tools wherein a drilling fluid is circulated in said well in contact with the walls thereof, the improvement comprising: circulating in said well as said drilling fluid a pumpable aqueous drilling fluid having enhanced lubricating properties and consisting of finely divided solids, water, and a small but effective amount, sufficient to provide said enhanced lubricating properties but insufficient to increase the viscosity of the drilling fluid to the extent that it cannot be readily pumped and circulated, of an amine selected from the group of amines having the formula

wherein: each R is selected from the group consisting of hydrogen, hydrocarbon radicals containing from 1 to 22 carbon atoms, amino substituted hydrocarbon radicals containing from 1 to 22 carbon atoms and also containing at least one —$NH_2$ substituent attached to a carbon atom other than a carbon atom which is alpha to a —$NH_2$ group, said hydrocarbon radicals wherein at least one —$CH_2$— other than a —$CH_2$— attached to a nitrogen atom is replaced with

and said amino substituted hydrocarbon radicals wherein at least one —$CH_2$— other than a —$CH_2$— attached to a nitrogen atom is replaced with

at least one R contains at least 8 carbon atoms, and the total number of nitrogen atoms in the molecule does not exceed 4; and mixtures of said amines; said amount of said amine being within the range of from 3 to 15 pounds per barrel of said fluid.

10. A process of drilling a well with a rotary bit which comprises forming a bore hole with said bit while circulating through said bit and through said bore hole in contact with the walls thereof a water base drilling fluid having enhanced lubricating properties and consisting of a mixture of: sufficient water to maintain said mixture fluid; sufficient finely divided inorganic solids to form a filter cake on the wall of the well; and a small but effective amount, sufficient to provide said enhanced lubricating properties but insufficient to increase the viscosity of the drilling fluid to the extent that it cannot be readily pumped and circulated, of an amine selected from the group of amines having the formula

wherein: each R is selected from the group consisting of hydrogen, hydrocarbon radicals containing from 1 to 22 carbon atoms, amino substituted hydrocarbon radicals containing from 1 to 22 carbon atoms and also containing at least one —$NH_2$ substituent attached to a carbon atom other than a carbon atom which is alpha to a —$NH_2$ group, said hydrocarbon radicals wherein at least one —$CH_2$— other than a —$CH_2$— attached to a nitrogen atom is replaced with

and said amino substituted hydrocarbon radicals wherein at least one —$CH_2$— other than a —$CH_2$— attached to a nitrogen atom is replaced with

at least one R contains at least 8 carbon atoms, and the total number of nitrogen atoms in the molecule does not exceed 4; and mixtures of said amines; said amount of said amine being at least 6 pounds per barrel of said drilling fluid.

References Cited

UNITED STATES PATENTS

| | | | |
|---|---|---|---|
| 2,320,009 | 5/1943 | Ralston et al. | 106—72 |
| 2,494,255 | 1/1950 | Hoehn | 252—8.5 |
| 2,995,515 | 8/1961 | Bobo | 252—8.5 |
| 3,022,248 | 2/1962 | Anderson et al. | 252—8.5 |

OTHER REFERENCES

Rogers: Composition and Properties of Oil Well Drilling Fluids, third edition, pub. 1963, by Gulf Pub. Co. of Houston, Texas, pages 531, 544 and 546.

Rosenberg et al.: Increased Drill Bit Life Through Use of Extreme Pressure Lubricant Drilling Fluids, article in Journal of Petroleum Technology, vol. 11, Aug. 1959, pages 195 to 199.

LEON D. ROSDOL, *Primary Examiner.*

H. B. GUYNN, *Assistant Examiner.*